United States Patent [19]

Frembgen

[11] Patent Number: 5,306,402

[45] Date of Patent: Apr. 26, 1994

[54] METHOD FOR CONTROLLING THE MACHINING CURRENT IN ELECTROCHEMICAL MACHINING

[76] Inventor: Fritz-Herbert Frembgen, Erfurter Strasse 31, D-87700 Memmingen, Fed. Rep. of Germany

[21] Appl. No.: 100,053

[22] Filed: Jul. 30, 1993

[30] Foreign Application Priority Data

Aug. 14, 1992 [DE] Fed. Rep. of Germany ....... 4227005

[51] Int. Cl.⁵ .......................... B23H 3/00; B23H 9/02
[52] U.S. Cl. ............................ 204/129.43; 204/129.5; 204/DIG. 9
[58] Field of Search .......... 204/129.43, 129.5, DIG. 9

[56] References Cited

U.S. PATENT DOCUMENTS

| | | | |
|---|---|---|---|
| 4,264,417 | 4/1981 | Vasiliev et al. | 204/129.5 X |
| 4,475,995 | 10/1984 | Ziegler et al. | 204/129.5 X |
| 4,885,066 | 12/1989 | Kuwabara | 204/DIG. 9 |
| 5,225,053 | 7/1993 | Frembgen | 204/129.5 X |

*Primary Examiner*—Donald R. Valentine
*Attorney, Agent, or Firm*—Notaro & Michalos

[57] ABSTRACT

In electrochemical machining of workpieces a predetermined product of current quantity and machining time (amp. seconds) is necessary to remove a given quantity of material from a workpiece edge. In order to minimize machining time it is proposed to divide the machining process into at least two machining periods, a first short one during which a relatively small working current is applied and a longer second one during which a much higher working current is set. Between both periods a discontinuous momentary steep current rise in the region of 100 percent to 1000 percent is effected. Due to this new method not only the total machining time is reduced but the current feed control becomes easier and test runs in many cases are unnecessary.

9 Claims, No Drawings

METHOD FOR CONTROLLING THE MACHINING CURRENT IN ELECTROCHEMICAL MACHINING

This invention relates to an improved method for controlling the machining current in electrochemical machining, in which between a stationary tool and a stationary metallic workpiece a working gap is formed, a liquid electrolyte is flown through said working gap, an anode of a variable DC current source is connected to the workpiece the cathode thereof connected to said tool, the gap width increasing during machining by metal removal and in which the density of machining current as related to the machined surface area at the end of machining is on a higher level than at the start thereof.

A method of this kind is disclosed in my U.S. Pat. No. 5,225,053. According to this known method the total amount of metal removal is determined in a test run, in which the machining current can be held on a constant level. The product of strength of current and machining duration is proportional to the metal removal. In this test run a physical parameter for example the voltage rise in the machining gap is measured at interspaces or continuously holding the current on a constant level during the duration of the test run of the machining process. For the following machining processes however, not the constant current control is applied but the strength of current is uniformly increased continuously or step-by-step along the overall machining processes, starting with the same strength of current as in the test run and ending with a higher current of 10 percent above the starting value for example. This known method is based on the idea that because of the broadening working gap during machining due to metal removal the flow of electrolyte can be increased and therefore more heat can be removed from the machining area. Indeed this method has proved worthwhile and machining time is saved as compared with a method using a constant machining current during the working process.

One object of the present invention is to provide an improved method to further reduce the duration of an electrochemical working process.

A further object is to propose a method for applying a greater amount of electrical power in a working gap in a predetermined time length.

Last but not least it is an object of the present invention to feed electrical machining current in a discontinuous way to the working gap.

The improvement according to the present invention consists in that the electrochemical machining process of the kind described at the beginning is divided into at least two machining periods between which a discontinuous steep rise of current quantity is produced. The DC current can be uniformly applied or applied in pulses. For example the working process can start with a uniform DC current of 30 amp., which remains constant over a first machining period of 3 seconds, then a steep current rise up to 300 amp. is provided and this current level is maintained during a second machining period of 8 seconds. Alternatively in the first period a pulsed DC current of a level of 300 amp. is applied but having only small pulse widths. The steep rise of current quantity or current density is then effected by broadening the current pulses or changing to a uniform non-pulsed current of the same strength, i.e. 300 amp.

In the field of electrochemical machining especially abrasive machining to remove burs or flashes it can be shown that the bur to be removed is frequently non-uniform along the edge of a work piece. There are local areas at which the interspace between the work piece and the tool is smaller than at the rest of the work piece edge portions. Such protruding local areas can be named peaks or tops. Because at that peaks or tops the electrical resistance is very low a high current flow does result and the level of this high current must be limited to avoid superheating which would damage the work piece and also the tool because of spark discharge.

Thanks to the invention during the first machining period a low enough current strength is applied to avoid such super-heating. The level of the current strength is dependent on the number, form and length of the bur tops. A current strength of 0.5 amp. for each millimeter machining area overall length at the start of the machining process is a safe value. The duration of the first machining period depends also on the shapes and frequency of the bur tops. Generally this duration of the first period is in the region between 10 percent and 40 percent of the total machining time. In many cases a first period lasting between 1 second and 3 seconds at most is sufficient to remove the peaks of the burs or flashes whereby these burs are leveled. After that leveling the steep or jump current rise takes place raising the current at least by 30 percent of the initial value. However, in most cases the current is jumped on a level which is from 3 times to 10 times as great as the current level at the end of first period without overheating and vaporizing the electrolyte.

Dependent on the overall time length of the machining process the second machining period maintaining the current level at the end of the steep rise can be followed by a second current rise step. However, in most cases a one-step current control method is sufficient in which two machining periods are provided, a first shorter one operating with a relatively low constant or increasing start current and second longer one operating with a substantially constant high end current strength with a very short-time discontinuous steep current rise therebetween. The inventive method results in a further reduction of machining time. Furthermore the software program for controlling the current is easier. In many cases test runs need no more necessary. But they make sense to minimize the percentage duration of the first machining period and to maximize the current strength during the first machining period and for the second machining period.

In most applications the method according to the present invention brings advantageous results if the duration of the first machining period amounts to one third of the total machining time and the current strength during this first period is calculated to correspond to 0,5 amp. for each millimeter of the overall length of the gap edge to be machined. The steep current rise following said first period amounts to at least 300 percent of the starting current at the begin of the first period. This elevated high current is held constant during the second period.

EXAMPLE

A chain wheel having burs the heigth thereof on an average amounting to 0,7 mm is to be electrochemically machined to achieve a smooth surface. The gap edge length is 200 mm.

a) If the usual constant current principle is used according to the known art the machining current is set to be 100 amp. After 20 seconds the process is finished. The current-time-product amounts to 2000 amp. seconds.

b) According to the art described in my U.S. Pat. No. 5,225,053 mentioned at the beginning the process is started with a current of 100 amp. Then the current is continuously raised to reach an end value which is 110 amp. After 19 seconds the required current-time-value which is 2000 amp. seconds is reached. If a current end value of 300 amp. instead of 110 amp. is chosen the total machining time will be 10 seconds in order to apply totally 2000 amp. seconds.

c) The method according to the present invention is started at 100 amp. This current strength is maintained during the first machining period lasting 3 seconds. Thereafter the current is momentarily increased to 300 amp. and this current strength is maintained during the second period which requires 6 seconds to apply the comparative value of totally 2000 amp. seconds. The overall machining time then is 9 seconds.

The overall current quantity of 2000 amp. seconds is the same in all aforementioned current control methods. The machining time of the method of the present invention amounts to only 45 percent of that value needed according to the constant-current-method described in lit. a). In comparison with the improved method according to lit. b) second embodiment a time reduction after all of 10 percent is achieved by the invention. This time saving is remarkable in industrial scale manufacture and it should be recognized that the time saving can be further increased if the bur configuration does allow to increase the current strength at the start of or during the first period. Also in many cases the time proportion of the first period to the overall machining time can be reduced to 20 percent and less.

The high end current during the second machining period is of most influence on saving machining time. The upper limit of the end current is defined by the average gap width between the tool and the work piece which gap width limits the quantity of electrolyte passing therethrough. Furthermore if a good contact is provided between the anode and the work piece not only electrically but also thermically, the transition resistance can be held small and as a result the current end value can be raised.

According to the invention important time and current parameters can be defined as follows: The percentage duration of the first machining period with respect to the overall machining time is dependent on the proportion of the sum of bur containing areas or/and areas intensively to be machined on the one hand and the overall edge length of the working gap on the other hand. If this proportion is only small a low percentage value of the first machining period time can be predetermined. The average strength of current during the first machining period is chosen in the region between 0,5 amp. to 5,0 amp. per millimeter of the overall gap edge length. If the proportion of the sum of those local areas of the gap edge which have high burs or peaks in relation to the overall gap edge length is small, only a start current in the lower portion of a.m. region can be chosen, because otherwise local overheating would occur. But if the gap edge to be machined is more even or more uniform a higher current in the upper portion of the a.m. region can be determined during the first machining period, because this higher current does divide substantially along the overall length of the edge to be machined.

Also in determining the value of the momentary steep current rise, the proportion of the sum of intensively to be machined bur or flash areas in relation to the overall edge length of the work piece is of influence, because if the number and extensions of such intensively to be machined areas are only small, these areas are levelled already during the first machining period, so that multiplying factor for the current rise can be chosen in the upper portion of the region between the value 2 and the value 10 as related to the current used in the first machining period, at least if the other aforementioned criteria do permit such high end current strengths.

I claim:

1. Improved method for controlling the machining current in electrochemical machining, in which between a stationary tool and a stationary metallic workpiece a working gap is formed, a liquid electrolyte is flown through said working gap, an anode of a variable DC current source is connected to the workpiece the cathode thereof connected to said tool, the gap width increasing during machining by metal removal and in which the density of machining current as related to the machined surface area at the end of machining is on a higher level than at the start thereof, the improvement comprising a machining process composed of at least two machining periods between which a discontinuous steep current rise is produced.

2. Method as claimed in claim 1 wherein during the first machining period the strength of current is held on a substantial constant level prior to the steep current rise and lasting said first machining period in a region between 10 percent to 40 percent of the overall machining time.

3. Method as claimed in claim 1 wherein during the first machining period the strength of current is continuously increased prior to the discontinuous steep current rise and wherein the length of the first machining period is held in a region between 10 percent and 40 percent of the overall machining time.

4. Method as claimed in claim 1, wherein the amount of the steep current rise is at least 30 percent of the current value at the end of the first machining period.

5. Method as claimed in claim 1, wherein the strength of the current at the end of the machining process is at least three times as great as at the start thereof.

6. Method as claimed in claim 1, wherein the steep current rise has an amount in the region between 200 percent and 1000 percent of the strength of current applied at the start of the machining process and wherein a value in the upper half of said region is applied if the proportion of the sum of that machining area lengths at which much metal is to be removed as related to the overall length is small.

7. Method as claimed in claim 1, wherein the current strength applied during that machining period following the steep current rise is held on a substantially constant value.

8. Method as claimed in claim 1, wherein the percentage duration of the first machining period in relation to the total duration of the machining process is small if the proportion of the sum of that machining area lengths having small gap widths in relation the overall gap length is small and wherein the time length of the first machining period in relation to the total duration of the machining process is increased dependent on an increase of said proportion.

9. Method as claimed in claim 1, wherein the strength of current at the start of the machining process is in the region between 0,5 amperes to 5 amperes for each millimeter of machining area length and wherein a value in the lower half of said region is applied if the proportion of the sum of those area lengths having small gap widths in relation to the total gap length is small.

* * * * *